J. O. DECKER.
MOTOR SLEIGH.
APPLICATION FILED MAR. 20, 1915.
1,193,365. Patented Aug. 1, 1916.
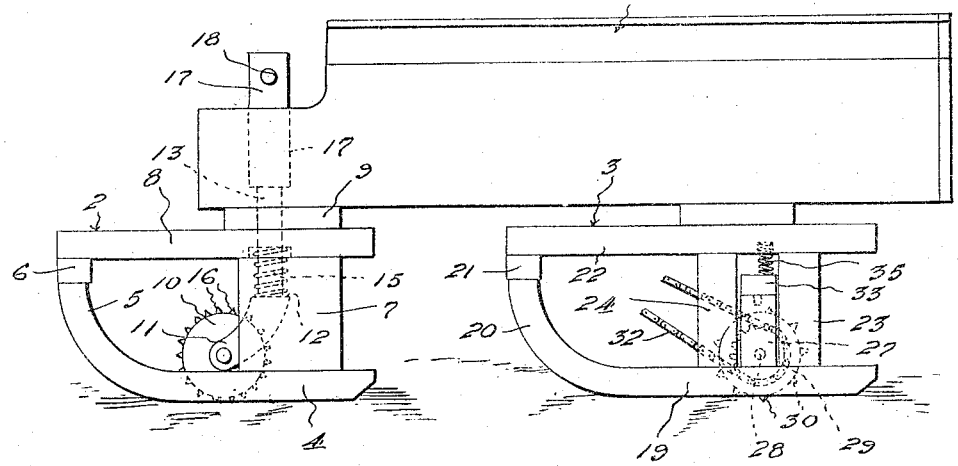
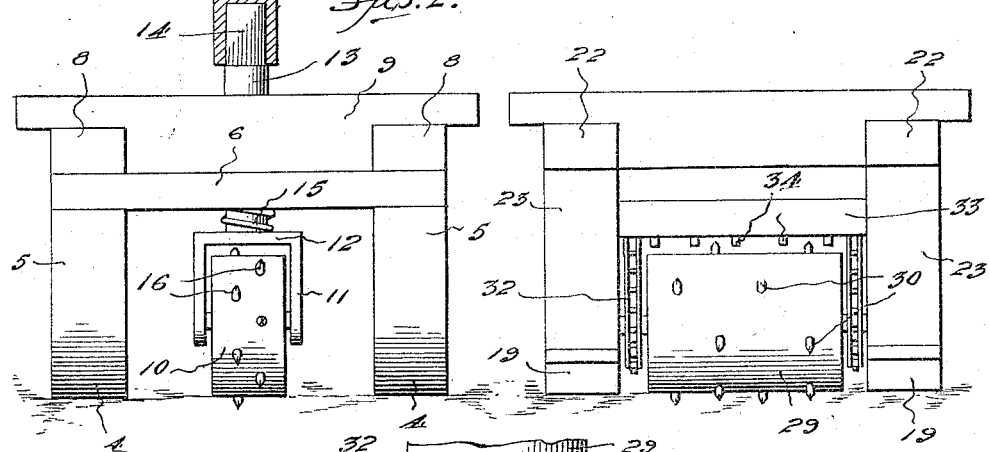
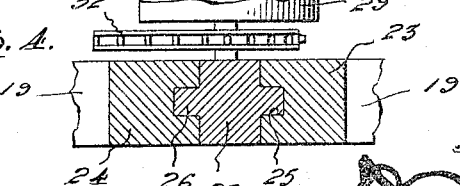
Inventor
J. O. Decker

UNITED STATES PATENT OFFICE.

JOHN O. DECKER, OF ORAFINO, NEBRASKA.

MOTOR-SLEIGH.

1,193,365.

Specification of Letters Patent.

Patented Aug. 1, 1916.

Application filed March 20, 1915. Serial No. 15,822.

*To all whom it may concern:*

Be it known that I, JOHN O. DECKER, a citizen of the United States, residing at Orafino, in the county of Frontier and State of Nebraska, have invented certain new and useful Improvements in Motor-Sleighs; and I do hereby declare the following to be a full, clear, and exact description of the invention, such as will enable others skilled in the art to which it appertains to make and use the same.

This invention relates to new and useful improvements in motor sleighs, and has for its principal object to provide a traction device for such sleighs which will effectively bite into the surface over which it is traveling and propel the vehicle.

Another object of the invention is to provide a steering means for the vehicle which will bite into the surface and effectively steer the device.

A further object of the invention is to provide a novel means for forcing the steering device and tractive mechanism into engagement with the surface over which the device is traveling.

With these and other objects in view, the invention consists in the novel combination and arrangement of parts which will be fully set forth in the following specification and accompanying drawings, in which, Figure 1 is a side view in elevation of a vehicle showing these improved bobs attached thereto, Fig. 2 is a front view in elevation of the front bob, Fig. 3 is a rear view in elevation of the rear bob, and Fig. 4 is a horizontal sectional view showing the guides for the bearings.

Referring now to the drawings by characters of reference, the numeral 1 designates as an entirety a vehicle of the usual construction to which the front and rear bobs, designated generally by the numerals 2 and 3 respectively, are connected.

The front bob comprises a pair of runners 4, the forward ends of which are upturned as at 5 and are connected to each other by means of a bar 6. A suitable upright 7 is supported near the rear end of each of the runners 4 and forms a rear end support for the bars 8 which extends parallel to the runners 4 as clearly shown in the drawings.

Connecting the bars 8 near their rear ends is the plate 9 which is formed with a central aperture for the reception of the steering mechanism which will be more fully hereinafter described.

The steering mechanism above referred to, comprises a roller 10 which is mounted between the arms 11 of the frame 12, which arms are curved as clearly shown in Fig. 1. A suitable stem 13 formed with the rectangular portion 14, is secured to the frame 12 and projects through an aperture formed in the bar 9 hereinbefore referred to. A suitable recess is also formed in said bar and the inner wall of the recess forms an abutment for the spring 15 which bears against the bar 9 and the upper face of the frame 12. A plurality of pins 16 are secured in the periphery of the roller 10 in staggered relation and these pins are arranged to engage the surface over which the device travels. In order that the stem 13 may be turned, the socket 17 is provided and carries at its upper end a suitable cross piece 18, which forms a handle. The socket 17 fits over the squared portion 14 of the stem 13 as clearly illustrated in Fig. 2.

The rear bob, designated generally by the numeral 3, comprises the runners 19, the forward ends of which are upturned as at 20 and connected by the cross bar 21. A pair of parallel bars 22 are provided and are secured to the bar 21 as clearly shown in Fig. 1. These bars are supported at their rear ends by means of the uprights 23 and 24 which are provided with vertically extending grooves 25 for the reception of the guide tongues 26, carried by the member 27 which is formed with an aperture for the reception of the shaft 28. This shaft 28 carries the drum 29 which, like the roller 10, is provided with a plurality of pins 30 arranged in staggered relation. Suitable drive sprockets are carried on the ends of the drum and over these drive sprockets are the chains 32 which serve as a means for transmitting power to the drum. A suitable bar 33 connects the members 27 at their upper ends, and these bars carry a series of downwardly extending lugs 34 which are arranged to pass between the pins 30 and remove any matter which may gather therebetween. Suitable coil springs 35 bear on the ends of the bar and in suitable recesses formed in the bars 22.

It will be apparent from the foregoing that in use when power is transmitted to the drum 29 through the means of the chains 32, the same will be rotated and the teeth or pins 30 will bite into the surface over which the device is traveling and thereby cause the whole to move. In turning, the handle 18 is manipulated to revolve the shaft 13 and thereby cause the roller 10 to move laterally and thereby steer the device.

While in the foregoing there has been shown and described the preferred embodiment of this invention, it is to be understood that such changes may be made in the combination and arrangement of parts as will fall within the spirit and scope of the invention as claimed.

What I claim is:

1. In combination with a bob having a pair of uprights, bearings slidable in said uprights, a roller journaled in the bearings, pins in the roller to engage the surface being traversed, a cleaner bar connected to the upper ends of the bearings at a point above the roller, pins carried by the cleaner bar and passing between the pins on the roller to prevent the same from clogging, and springs bearing downwardly on the bar to force the roller into engagement with the surface traversed.

2. In combination with a bob having spaced uprights, said uprights having their opposing faces provided with grooves, bearings provided with tongues slidably mounted between the uprights in the grooves, a roller provided with a plurality of staggeredly arranged pins journaled in said bearings, a cleaner bar resting upon and connected to the upper end of said bearings, pins depending from and connected to the under side of said bar, said pins passing between the pins of the roller to prevent clogging of the same, said bar located at a predetermined point above said roller, springs carried by the bobs and connected to the cleaner bar for forcing the bearings downwardly thereby forcing the pins of the roller into the surface being traversed.

In witness whereof I affix my signature in presence of two witnesses.

JOHN O. DECKER.

Witnesses:
V. R. SCHOBER,
B. F. BUTLER.

Copies of this patent may be obtained for five cents each, by addressing the "Commissioner of Patents, Washington, D. C."